UNITED STATES PATENT OFFICE.

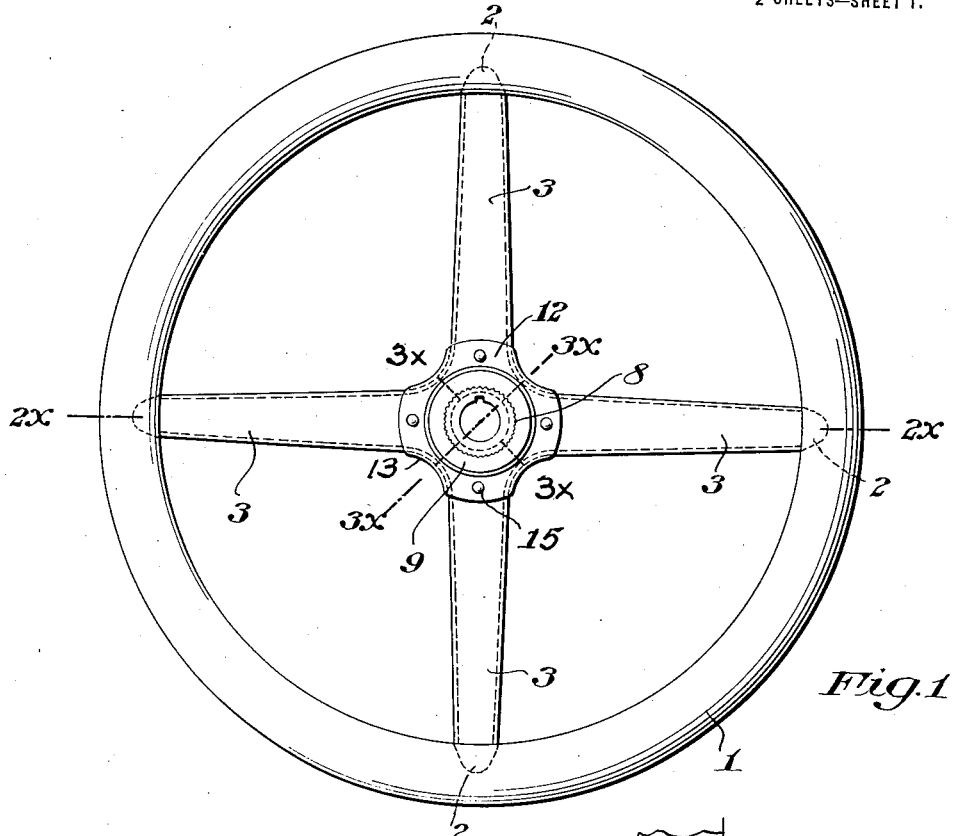
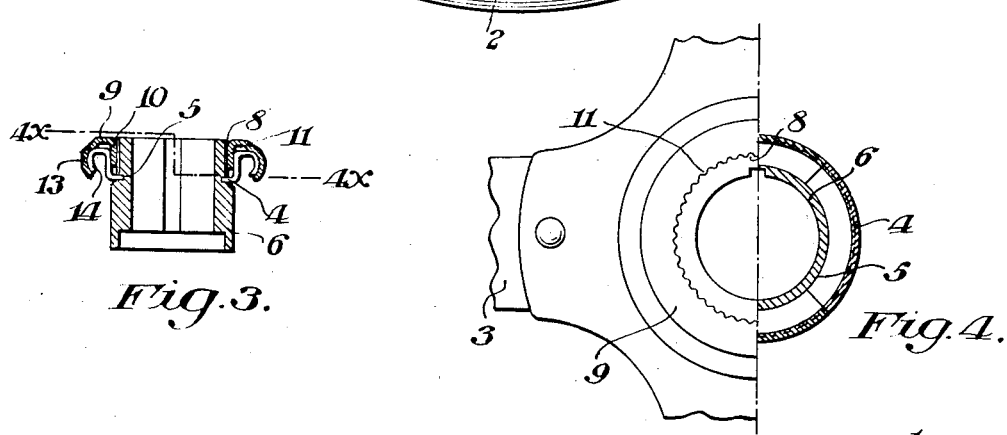
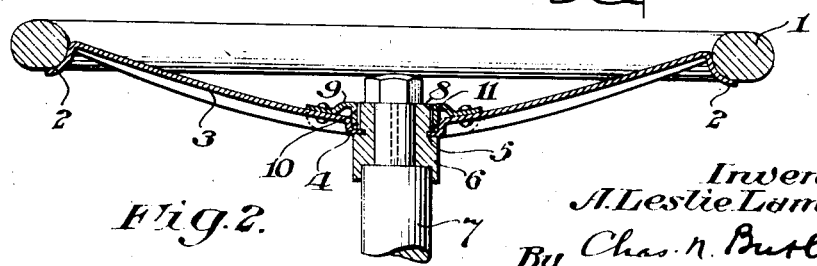

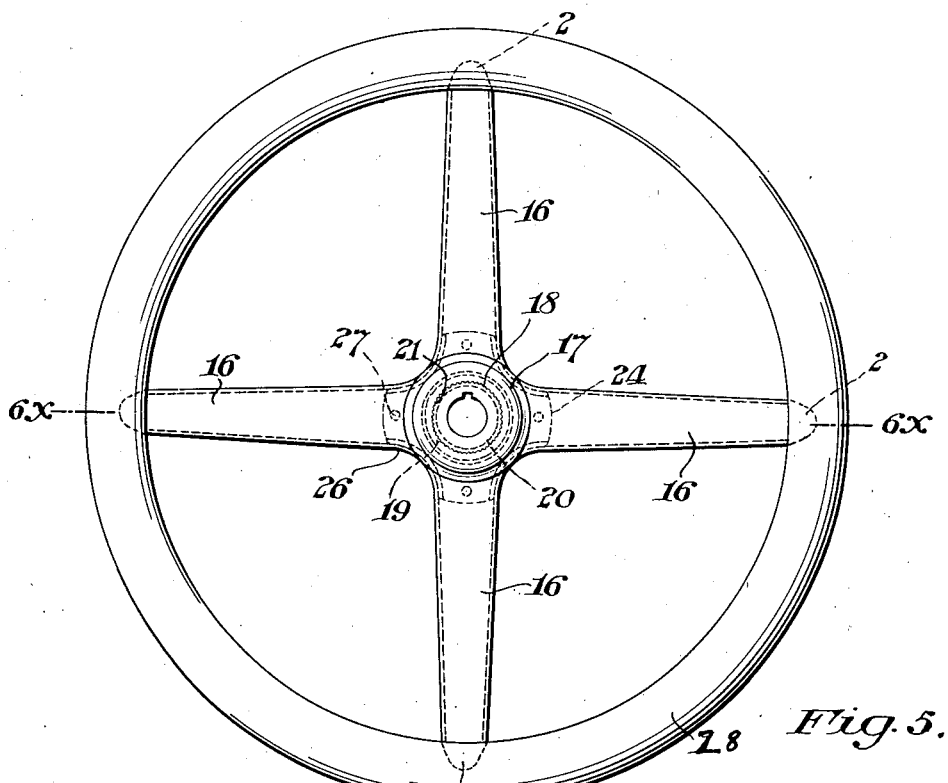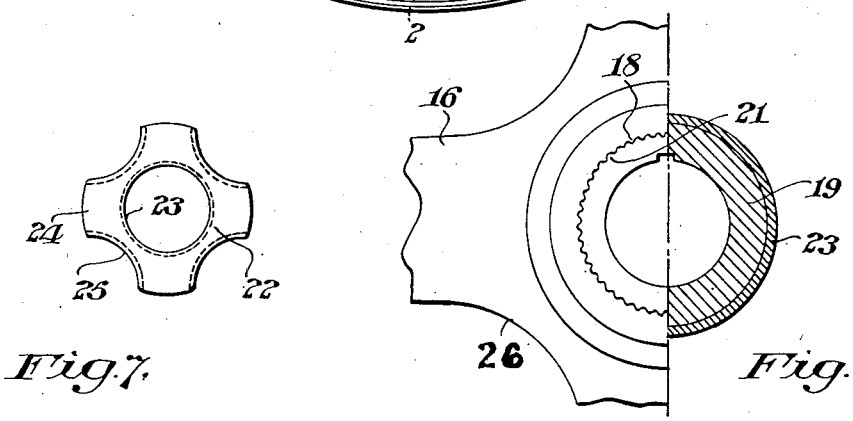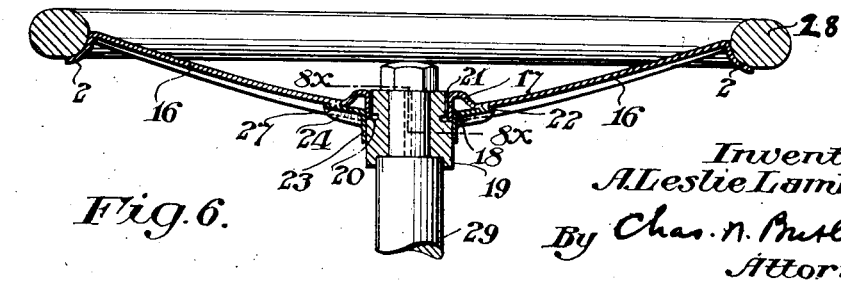

ALBERT LESLIE LAMBERT, OF NARBERTH, PENNSYLVANIA.

STEERING WHEEL.

1,404,035.  Specification of Letters Patent.  Patented Jan. 17, 1922.

Application filed February 10, 1920. Serial No. 357,563.

*To all whom it may concern:*

Be it known that I, ALBERT LESLIE LAMBERT, a citizen of the United States, residing at Narberth, in the county of Montgomery and State of Pennsylvania, have invented certain new and useful Improvements in Steering Wheels, of which the following is a specification.

This invention relates more particularly to improved means for connecting the spokes and hubs of steering wheels, and its leading purpose is to provide a simple, inexpensive and efficient construction comprising parts that can be made and assembled with facility.

The characteristic features of my improvements are embodied in the constructions set out in the following description and the accompanying drawings in illustration thereof.

In the drawings, Fig. 1 is a plan view of a steering wheel embodying my improvements; Fig. 2 is a sectional view taken on the line $2^x$—$2^x$ of Fig. 1 longitudinally through opposite spokes and the axis of the wheel applied to a steering post; Fig. 3 is a sectional view on the line $3^x$—$3^x$ of Fig. 1; Fig. 4 is an enlarged sectional view taken on the line $4^x$—$4^x$ of Fig. 3; Fig. 5 is a plan view of a modified form of the wheel; Fig. 6 is a sectional view taken on the line $6^x$—$6^x$ of Fig. 5; Fig. 7 is a detached plan view of a coupling shown in Figs. 5 and 6, and Fig. 8 is an enlarged sectional view taken on the line $8^x$—$8^x$ of Fig. 6.

In the construction shown in Figs. 1 to 4 inclusive, the wheel comprises the rim 1 engaging the outer ends 2 of pressed metal spokes 3 having inner ends joined on the radial line $3^x$—$3^x$ and provided with flanges 4 which fit in the circular channel 5 of the hub 6, the latter being adapted for engagement on a steering post 7.

The hub 6 is provided, above the channel 5, with the peripheral corrugations 8 parallel with its axis. The spokes 3 are fixed together and to the hub by a pressed metal coupling 9 having a hub 10 provided with corrugations 11 adapted to register and interlock with the corrugations 8 and with the projections 12 which conform with the spokes 3, these projections being connected by curved webs or flanges 13 which conform with the curved webs or flanges 14 of the inner ends of the spokes. Rivets or spot welds 15 are used for further fixing the parts 3 and 9 together.

The wheel is assembled by fitting the spokes 3 together with their inner lips or flanges 4 inserted in the channel 5. The coupling 9 is telescoped on the hub 6 with the respective corrugations 8 and 11 interlocked, and the parts 12 and 13 of the coupling are curved around and fixed to the spokes. The rim 1 is fixed to the bearings 2, and the assembled wheel is adapted to be applied to the post 7.

In the construction shown in Figs. 5 to 8 inclusive, the spokes 16 are formed integrally with the hub 17 which is provided with the internal corrugations 18. The hub 17 is telescoped on the hub 19 into abutting relation with its shoulder 20 and interlocked by the engagement of the corrugations 21 thereon with the corrugations 18.

A coupling 22 has a hub 23 which is telescoped on the hub 19 below the spokes 16 and the radial projections 24 which conform with the interior of the spokes, these projections being provided with and connected by curved webs or flanges 25 which conform with and are interlocked within like parts 26 on and connecting the spokes. The spokes 16 and coupling 24 are secured together further by the rivets or spot welds 27 and the rim 28 is fixed to the spokes, providing a wheel adapted to be applied to the post 29.

Having described my invention, I claim:

1. A steering wheel comprising a ribbed hub, spokes, and coupling means including ribs fixed to said spokes and interlocked with the ribs of said hub, said means comprising a coupling member having a hub telescoped on said hub first named and flanged parts engaging said spokes.

2. A wheel having a hub provided with peripheral ribs parallel to its axis and a peripheral bearing transverse to said ribs, spokes having flanged means at their inner ends engaging said bearing, and a coupling having a ribbed hub telescoped on said hub first named and flanged projections interlocked with said spokes.

In testimony whereof I have hereunto set my name this 7th day of February, 1920.

ALBERT LESLIE LAMBERT.